US009477670B2

(12) United States Patent
Bhasin et al.

(10) Patent No.: US 9,477,670 B2
(45) Date of Patent: Oct. 25, 2016

(54) INFORMATION MANAGEMENT POLICY BASED ON RELATIVE IMPORTANCE OF A FILE

(75) Inventors: Gautam Bhasin, Karnataka (IN); Kalambur Subramaniam, Karnataka (IN); Albrecht Schroth, Boeblingen (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 13/553,657

(22) Filed: Jul. 19, 2012

(65) Prior Publication Data
US 2013/0262418 A1 Oct. 3, 2013

(30) Foreign Application Priority Data

Apr. 2, 2012 (IN) .......................... 1317/CHE/2012

(51) Int. Cl.
*G06F 7/00* (2006.01)
*G06F 17/30* (2006.01)
*G06F 11/14* (2006.01)

(52) U.S. Cl.
CPC ... *G06F 17/30082* (2013.01); *G06F 17/30067* (2013.01); *G06F 11/143* (2013.01); *G06F 11/1451* (2013.01)

(58) Field of Classification Search
CPC ..................... G06F 17/30067; G06F 11/1451; G06F 11/143
See application file for complete search history.

(56) References Cited

U.S. PATENT DOCUMENTS

| | | | |
|---|---|---|---|
| 6,654,901 B1 | 11/2003 | Nakai et al. | |
| 6,766,314 B2 * | 7/2004 | Burnett | 707/694 |
| 7,028,221 B2 * | 4/2006 | Holland | G06Q 10/04 702/119 |
| 7,496,173 B2 * | 2/2009 | Goldman et al. | 378/65 |
| 7,634,566 B2 | 12/2009 | Turner et al. | |
| 8,549,647 B1 * | 10/2013 | Mason | G06F 21/564 726/23 |
| 2003/0217052 A1 * | 11/2003 | Rubenczyk et al. | 707/3 |
| 2005/0283649 A1 * | 12/2005 | Turner et al. | 714/6 |
| 2006/0004868 A1 * | 1/2006 | Claudatos et al. | 707/104.1 |
| 2007/0260640 A1 * | 11/2007 | Hamilton | G06F 17/30082 |
| 2009/0204611 A1 | 8/2009 | Kamada et al. | |
| 2009/0254572 A1 * | 10/2009 | Redlich et al. | 707/10 |
| 2009/0327243 A1 * | 12/2009 | Pradhan | G06F 17/30699 |
| 2010/0088317 A1 * | 4/2010 | Bone | G06F 17/30144 707/737 |
| 2011/0022601 A1 | 1/2011 | Elrom et al. | |

(Continued)

FOREIGN PATENT DOCUMENTS

CN 101604341 12/2009

OTHER PUBLICATIONS

"Drools—The Business Logic integration Platform", http://www.jboss.org/drools; 2012.

(Continued)

*Primary Examiner* — Loan T Nguyen
(74) *Attorney, Agent, or Firm* — Hewlett Packard Enterprise Patent Department

(57) ABSTRACT

The relative importance of a file is determined based on an importance parameter and an information management policy is caused to be applied to the file based on the determined relative importance of the file. The importance parameter may be the author of the file, the number of users with whom the file is shared, the relationship between the users with whom a file is shared, the uniqueness of the file, or the presence of particular keywords in the file.

11 Claims, 4 Drawing Sheets

(56) References Cited

U.S. PATENT DOCUMENTS

2011/0320389 A1* 12/2011 Donovan et al. .............. 706/12
2012/0179656 A1* 7/2012 Bunte ................. G06F 11/1451
              707/667

OTHER PUBLICATIONS

"Noisy text analytics", Wikipedia, 2012, http://en.wikipedia.org/wiki/Noisy_text_analytics.

* cited by examiner

INFORMATION MANAGEMENT POLICY BASED ON RELATIVE IMPORTANCE OF A FILE

CLAIM FOR PRIORITY

The present application claims priority under 35 U.S.C 119 (a)-(d) to Indian Patent application number 1317/CHE/2012, filed on Apr. 2, 2012, which is incorporated by reference in its entirety.

BACKGROUND

In recent years the amount of data stored by enterprises and individual users has increased dramatically. As more and more documents are stored on computers and portable electronic devices, information management policies have developed to ensure that back-up copies are available and that data is properly encrypted.

Some systems may define a common information management policy for all files—e.g. all files will be backed up every day. Other systems may vary the information management policy based on the file type. E.g. a different back up policy may be applied to source code files compared to emails or graphic files.

BRIEF DESCRIPTION OF THE DRAWINGS

Examples will now be described, by way of non-limiting example only, with reference to the accompanying drawings, in which:

FIG. 1 (*b*) shows a device on which a file management policy is implemented according to another example;

FIG. 1 (*c*) shows a device on which a file management policy is implemented according to another example;

DETAILED DESCRIPTION

Figure 1A:
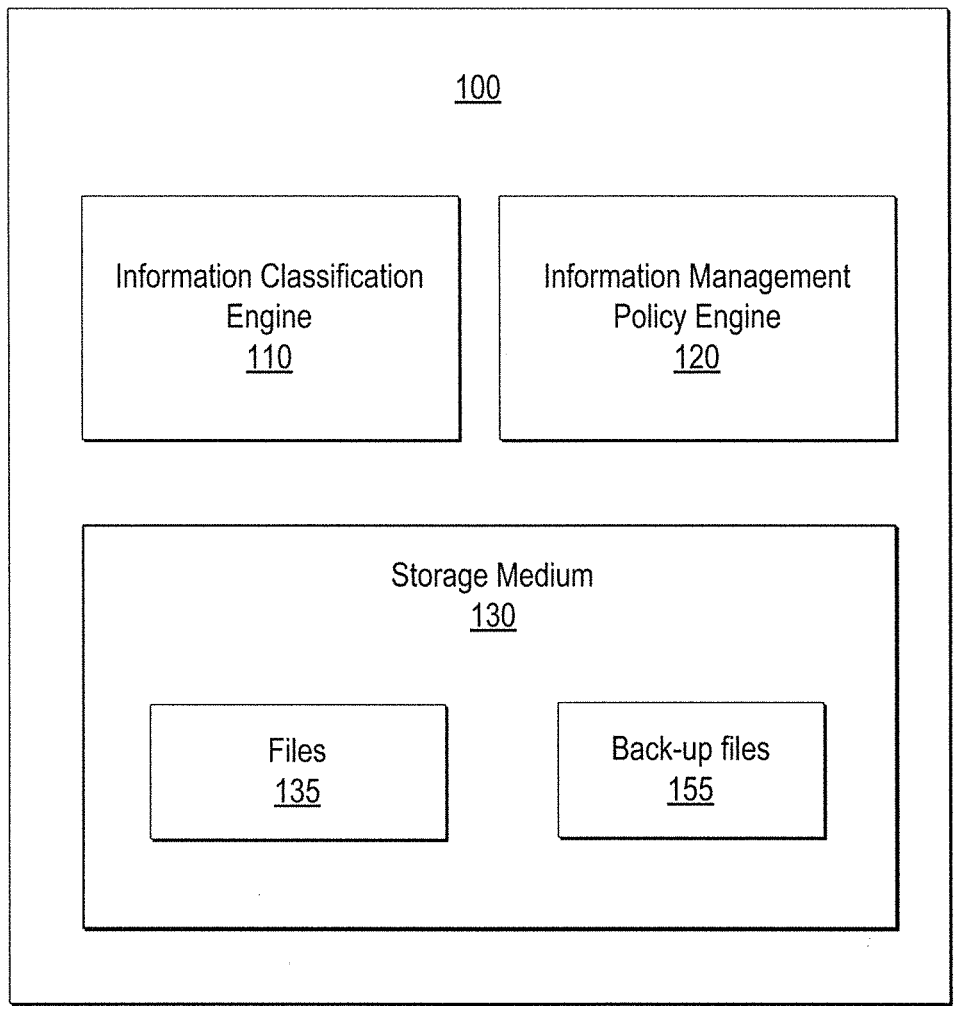
FIG. 1 (*a*) shows a device on which a file management policy is implemented according to one example.
Figure 1B:
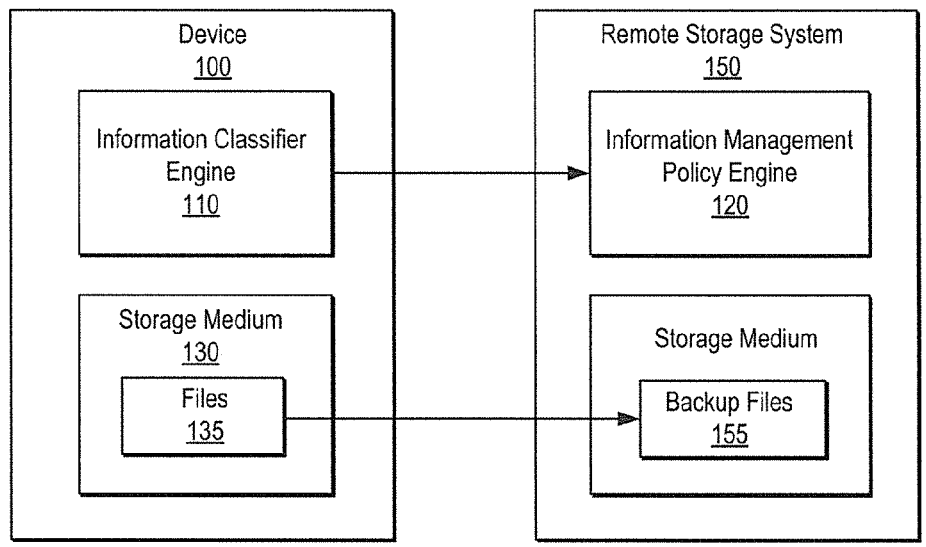
Figure 1C:
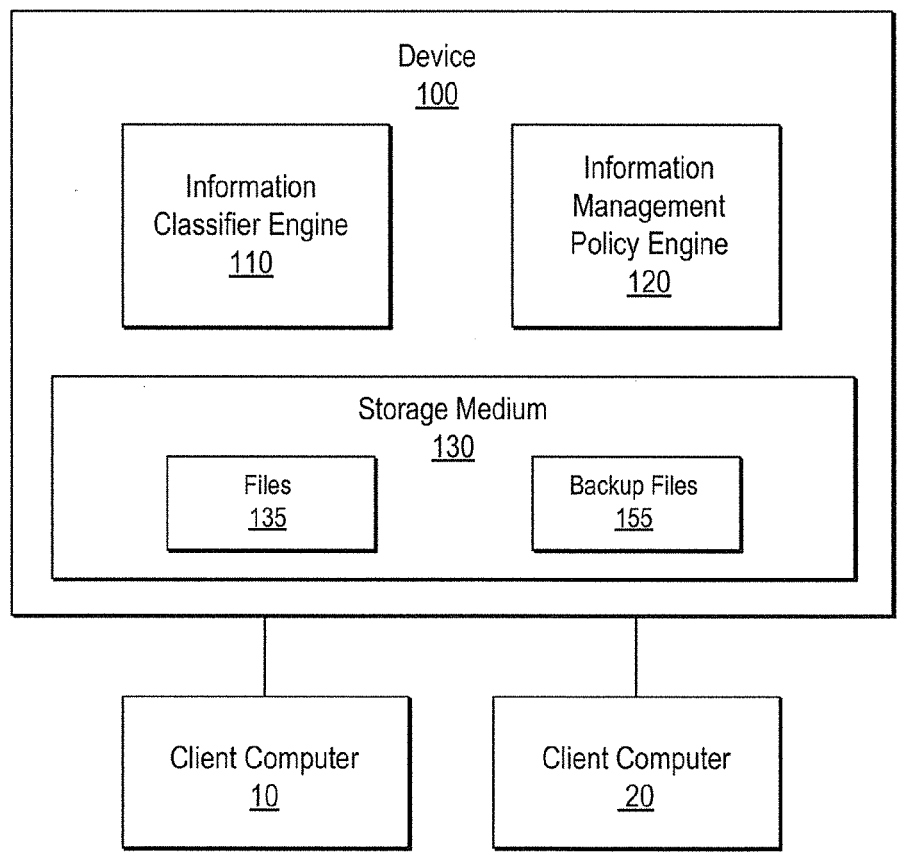

FIG. 1 (*a*) is a schematic diagram showing a device 100. The device may for instance be a computing device such as, but not limited to, a personal computer, laptop or notebook computer, mobile phone, tablet device, etc. The device 100 has an importance classifier engine (ICE) 110, an information management policy engine (MPE) 120, and a non-volatile storage medium 130 such as a hard disk or flash memory etc for storing data. The data comprises one or more files 135, such as but not limited to, any of the following: documents with numerical or text data, word processed documents, pdf documents, text files, text messages, presentation slides, spreadsheets, source code, photos, audio data, video data etc.

The ICE and MPE may for example be implemented as machine readable instructions stored in a memory and executable by a processor or as hardware modules or logic circuitry.

The importance classifier engine (ICE) 110 determines the relative importance of a file. The information policy management engine (MPE) 120 applies an information management policy to the file based upon the file's determined relative importance. Back-up copies 155 of the file may be stored on the device 100 itself, or may be stored elsewhere, in accordance with the information management policy (IM policy).

The information management policy is discussed in more detail later, and may for instance comprise a back-up policy, an archive policy, and/or a security policy for the file. As the information management policy is determined based on the output of the importance classifier engine, different files may be treated differently depending upon their determined relative importance. For instance, the number of back-up copies, frequency of back-up, encryption level etc may be varied depending upon the determined relative importance of the file. This differential treatment of files, based on their relative importance, may help end users and IT administrators to utilize resources efficiently.

FIG. 1 (*b*) shows an arrangement in which the device 100 stores files 135 locally and back-up copies of the files 155 are stored on a remote storage system 150. For example the remote storage system may be a server, NAS (network attached storage), SAN (storage area network), storage provided by a data centre etc. In this case the ICE 110 may be hosted on the device 100, while the MPE 120 may be hosted on the remote storage system 150.

FIG. 1 (*c*) shows another example in which the device 100 is a server and client computers 10, 20 send data to the server for storage. For example the server may host a storage space for personal or public data, storage resources on a local area network, storage resources in a data centre, a file sharing site such as SharePoint etc. In this example both the files 135 and the backup copies of the files 155 are stored on the server itself. In other examples the backup copies 155 may be stored on a remote storage system accessible to the server.

Figure 2:
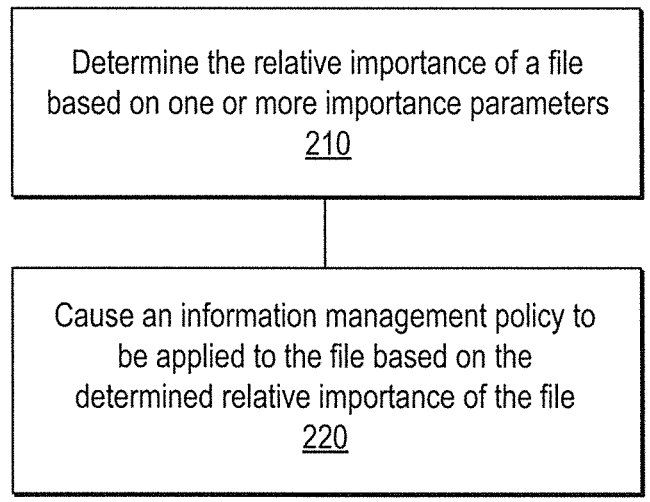
FIG. 2 is a flow diagram of a method of file management according to one example.

FIG. 2 is a flow diagram showing a method of managing files according the present disclosure. At block 210 the device 100 determines the relative importance of a file stored on a computer readable medium.

At block 220 the device 100 causes an appropriate information management policy to be applied to the file, based on the determined relative importance of the file. The device may cause the information management policy to be applied to the file by applying the policy directly (if the file is stored and backed up on the device itself), or may cause the information management policy to be applied to the file by sending instructions to another apparatus. For example in the arrangement of FIG. 1 (*b*) the device 100 sends instructions to the remote storage system 150 which is responsible for implementing the information management policy.

The relative importance of a file may be expressed as an information management policy profile (IM profile). The information management policy profile may for instance be numerical rating (e.g. a rating 1-5) or more qualitative (e.g. 'business critical', 'personal critical', 'personal general', 'general', 'confidential' etc).

The importance classification engine may communicate the IM profile to the information management policy engine, thus causing the information management policy engine to apply an appropriate information management policy to the file.

An information management policy may comprise a backup policy, archive policy and security policy. A backup policy typically specifies under what circumstances, or how often a file should be backed up and may specify where the backup should be stored. An archive policy is also concerned with storage of copies of the file, but tends to be concerned with long term storage and may for example specify a retention period, media longevity or other requirements to ensure an authentic version of the file is available in the future for legal or other reasons. The file may, in some cases, be archived in a storage system removed from everyday computing activities, which may make it less easily accessible. A security policy may specify one or more requirements relating to security, for example encryption of the file, or virus scanning etc. The information management policy may also specify whether a file is compressed for storage and if so, what compression system is used.

Various information management systems exist and many such systems are capable of applying various policies for back-up, archive and security of files. Typically such systems apply the same policy to all files, or apply different policies to files based on manual configuration or based on the file type (e.g. '.pdf', '.jpg', '.doc' etc).

In one example, the information management policy engine (MPE) 120 of the present disclosure may be implemented as a plug-in to an existing information management system. In this case the MPE 120 actively or passively obtains the relative importance of the file from the ICE 110. The MPE 120 converts the relative importance into settings or policies used by the information management system. As discussed above, in some implementations the relative importance may be expressed as an information management policy (IM) profile. In some implementations there may be a plurality of possible IM profiles and each profile may be mapped by the MPE 120 to an archive, back-up and security policies of the information management system. An example mapping is given in the table below.

| IM Profile | Back-up Policy | Archive Policy | Security Policy |
| --- | --- | --- | --- |
| Business Critical | Create 3 copies of file; Back-up every change to the file. | No archiving, as the data should always be available. | Encrypt data using 2048 bit encryption |
| Personal Critical | Backup every change of file | Archive to a local office | Encrypt data using 1024 bit encryption |
| Personal General | Backup incremental data once a week. Run full backup monthly | No archiving required | No encryption required |
| General | Backup incremental data once a week. Run full backup monthly | No archiving required | No encryption required |
| Confidential | Backup every change of file | Archive to most available storage | 2048 bit encryption |
| Other | Backup once a month | Archive to cheapest storage | No encryption required |

The relative importance of a file is determined based on one or more importance parameters. These importance parameters may include any of the following: the author of the file, the number of users whom the file is shared with, the relationship in an enterprise database between users sharing the file, the uniqueness of the file, or the presence of particular keywords in the file.

Figure 3:
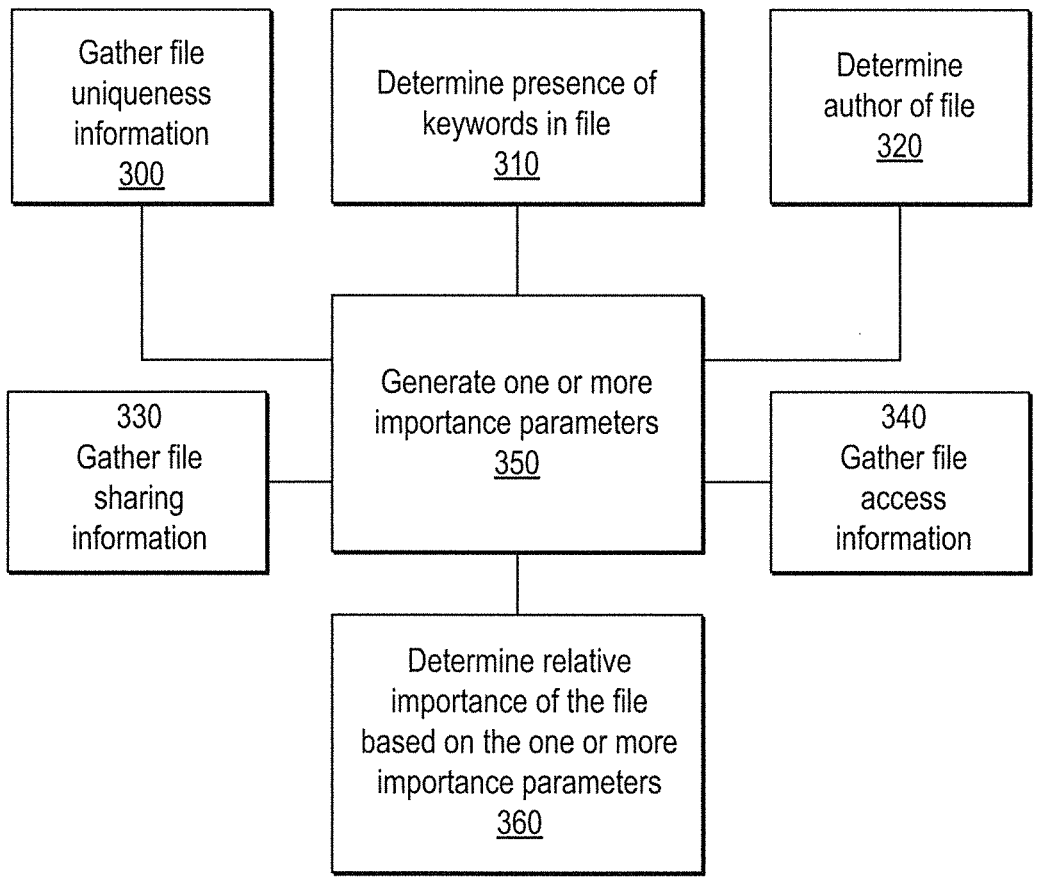
FIG. 3 is a flow diagram of a method of determining the relative importance of a file according to one example.

FIG. 3 shows an example method of determining the relative importance of a file based on one or more importance parameters. At 300, 310, 320, 330 and 340 information relating to the file is gathered. For example this may be carried out at the kernel level of the operating system, a programme at the application level or a combination thereof. Depending upon the implementation, one, any combination of, or all of the information types indicated in 300,310,320, 330 and 340 may be gathered.

At 300 information relating to the uniqueness of the file is gathered. The 'uniqueness' of the file means the uniqueness compared to other files in a storage system. The 'storage system' in which the comparison is made depends upon the context and may be the storage medium on which the file is stored, or may be a larger storage system. Thus the comparison may be to other files on the same storage medium only, other files on the same device, other files belonging to the same user, or other files in the enterprise storage system as a whole (if the system is applied in an enterprise setting). The specific comparison used to determine uniqueness may be set by a system administrator and may for instance be determined by scanning files with a program operating at the application level.

At 310 the presence of particular keywords in the file is determined. Such key words may be pre-set by a system administrator and this information may be obtained by searching the contents of the file at 340. The presence or absence of particular key words may in itself be an importance parameter.

At 320 the author of the file is determined. The author of a file is an importance parameter. Certain authors may have a greater importance attached to their files, due to their role in an organization.

At 330 file sharing information is gathered, for example the number of users whom a file is shared with (accessible to) and/or the relationship in an organization database between different users who share the file (for example whether they all work in the same department or different departments and their relative levels in the organization).

At 340 file access information is gathered. This information may be gathered at the kernel level, for example when a particular file is accessed. The information may be used to generate an importance parameter relating to file access, for example the frequency with which a file is accessed. In this disclosure the frequency with which a file is accessed is not used alone to determine the relative importance of the file, however the frequency of access may be used together with other importance parameters to determine the relative importance of the file.

At 350 one or more importance parameters are generated based on the gathered information. The importance parameters may correspond directly to the gathered information, or may be a filtered or modified subset of the gathered information. At 360 the relative importance of the file is determined based on the importance parameters and weightings or rules associated with the various importance parameters. Thus an importance parameter associated with a higher weighting will have more influence on the determination of relative importance than an importance parameter associated with a relatively lower rating.

Weightings and rules may be set and adjusted by the system administrator according the particular needs of the system and the end users. For example if a file contains words such as 'Privileged and Confidential', or 'Bank Statement' it may be given an IM profile indicating that the file is confidential. If the system is deployed in an enterprise, then if the author of a file is high up in the hierarchy of an organization then the file be classified as having higher relative importance, or as confidential if only a few people high up in the organization have access to the file. If the file is the only one existing in the storage system and is accessed regularly (above a certain frequency) it may be categorized as personal critical if it is not shared (accessible to one user only), or business critical if accessed by several different users.

In this way the files can be automatically classified into various levels of relative importance. An information management policy may then be specified for the file based on the file's relative importance and the file may be backed up in accordance with the information management policy.

As the files are automatically classified according to their relative importance, in some implementations a report may be run to indicate the amount of storage space used up by files of each category (e.g. space occupied by confidential files, personal critical files, business critical files etc).

In some possible implementations, access to the files may be monitored at the kernel level. In this case, as the files are automatically categorized according to relative importance, an alert or log entry may be generated each time a file of a particular relative importance is accessed (e.g. an alert or log entry may be generated each time a file having a 'confidential' IM policy is accessed).

Figure 4:
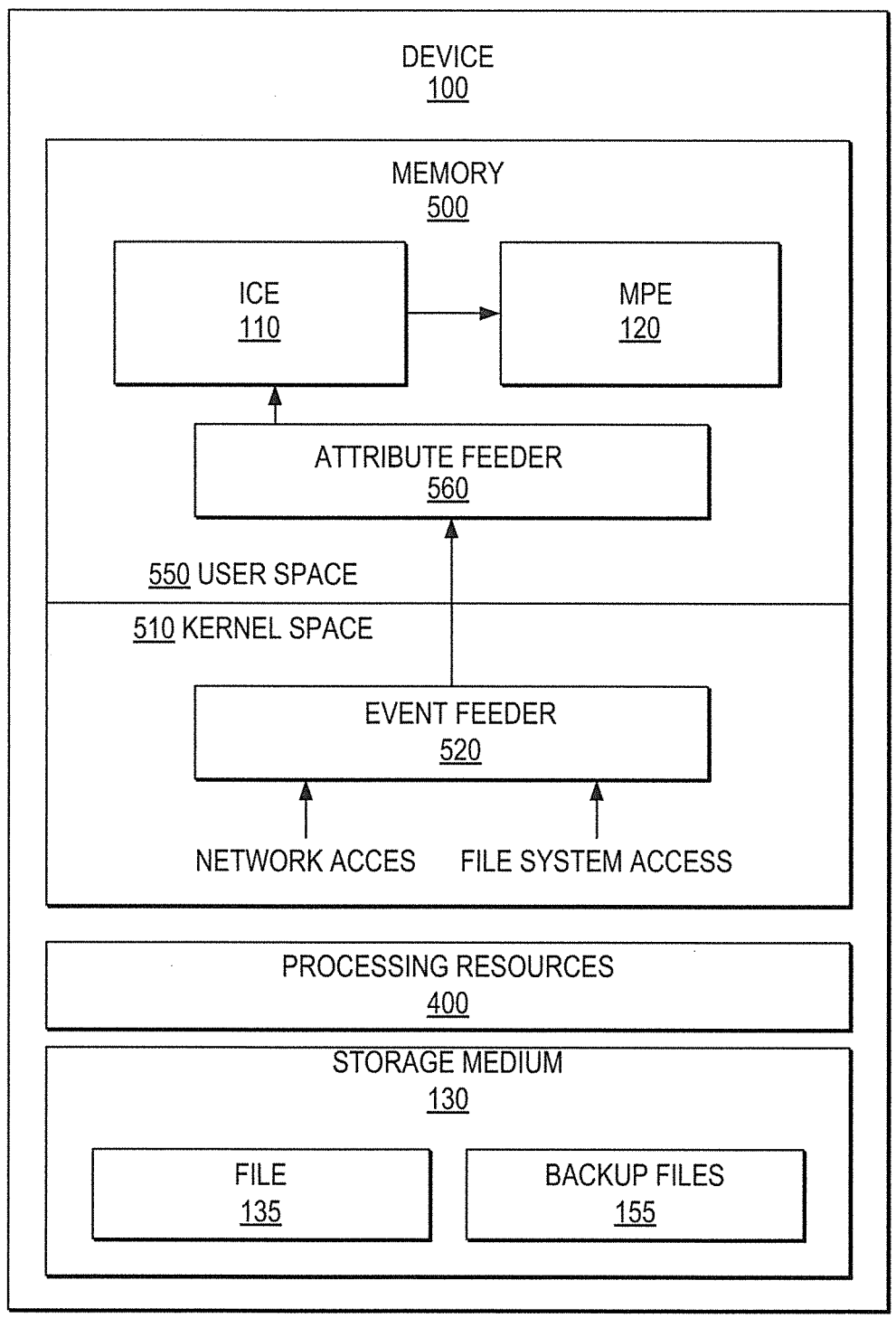
FIG. 4 shows an example of one possible structure of a device for implementing a file management policy.

FIG. 4 shows one example of a possible structure of a device 100 which may be used to carry out the teachings described herein. The device has processing resources 400 which may for instance be provided by one processor a plurality of processors. The device has a memory 500 which may be split into a kernel space 510 and a user space 550. The kernel space 510 stores an operating system (e.g. Windows, Unix, Android, IOS etc), while the user space 550 stores various programmes. The operating system and programmes may comprise machine readable instructions which are executable by the processing resources 400.

The user space 550 stores an importance classifier engine (ICE) 110 which is a module to determine the importance of a file. In the illustrated example, the user space 550 stores an information policy engine (MPE) 120 which is a module to apply an IM policy to a file. In other implementations the MPE 120 could be hosted elsewhere, for example on a remote storage apparatus.

The ICE 110 causes an information management policy to be applied to the file by determining a relative importance for the file and sending or otherwise making available this relative importance to the MPE 120. The relative importance may be expressed as an information management policy for the file.

The kernel space 510 may host an event feeder 520 which is a component of the operating system which provides information about the files or file accesses to applications running in the user space 550. For example, the event feeder 520 may detect file system or network access to a file and provide information about the file and the file access to applications in the user space 550.

The user space may host an attribute feeder 560 which filters and/or processes information from the event feeder 520 in order to generate one or more importance parameters which are passed on or made available to the ICE 110. The ICE 110 determines the relative importance of the file and communicates with the MPE 120 which applies an appropriate information management policy to the file based on the file's relative importance.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

Where an operation or process is described in the present disclosure it may be carried out automatically by a processor or machine, unless explicitly stated otherwise. References to a non-transitory computer readable storage medium in this application should be interpreted to include, but are not limited to, a magnetic disk, volatile or non-volatile RAM, ROM, flash memory, CD, DVD, optical storage media, magnetic tape etc. While a single storage medium is shown in several of the diagrams as an example, each device could have several storage media and data and files could be dispersed over several storage media.

What is claimed is:

1. A file management method comprising:
   gathering, by a processor of a computing device, information of a file related to a plurality of importance parameters, wherein the plurality of importance parameters include at least two of: an author of the file, a number of users sharing the file, a relationship between the users, a uniqueness of the file, and a presence of particular keywords in the file, and wherein each of the plurality of importance parameters has a predetermined weighting;
   determining a relative importance of the file, wherein the file is stored on a non-transitory computer readable storage medium, based on the gathered information of the file related to the plurality of importance parameters and the predetermined weighting of each of the plurality of importance parameters, wherein an importance parameter of the plurality of importance parameters having a higher weighting than another of the plurality of importance parameters has more influence than the another importance parameter on the determination of the relative importance of the file;
   classifying the file in one of a plurality of ratings based on the determined relative importance of the file; and
   applying at least one of a first backup policy of a plurality of backup policies and a first security policy of a plurality of security policies to the file based on the classified rating of the file.

2. The method of claim 1 applying both the first backup policy and the first security policy to the file.

3. The method of claim 1 wherein the uniqueness of the file is compared to other files stored in a storage system and wherein the storage system is scanned to determine the uniqueness of the file.

4. The method of claim 1 wherein an operating system provides file access information, based on file system access or network access to the file, and wherein said plurality of importance parameters are determined from said file access information.

5. The method of claim 1 wherein the relative importance of the file is further determined based on a rule associated with each of said plurality of importance parameters.

6. The method of claim 1, further comprising:
   expressing the relative importance of the file in an information management profile selected from a plurality of information management profiles.

7. The method of claim 6 wherein one of said information management profiles indicates that the file is confidential and wherein the method further comprises detecting that the file classified as confidential is accessed and logging or reporting that the file is accessed.

8. The method of claim 1 further comprising generating a report on an amount of storage space occupied by files of different relative importance.

9. A non-transitory computer readable storage medium storing machine readable instructions which are executable by a processor to:
gather information of a file related to a plurality of importance parameters, wherein the plurality of importance parameters include at least two of: an author of the file, a number of users sharing the file, a relationship between the users, a uniqueness of the file, and a presence of particular keywords in the file, and wherein each of the plurality of importance parameters has a predetermined weighting;
determine a relative importance of the file based on the gathered information of the file related to the plurality of importance parameters and the predetermined weighting of each of the plurality of importance parameters, wherein an importance parameter of the plurality of importance parameters having a higher weighting than another of the plurality of importance parameters has more influence than the another importance parameter on the determination of the relative importance of the file;
classify the file in one of a plurality of ratings based on the determined relative importance of the file; and
apply at least one of a first backup policy of a plurality of backup policies and a first security policy of a plurality of security policies to the file based on the classified rating of the file.

10. An apparatus for file management comprising:
a processor; and
a memory storing instructions that when executed by the processor cause the processor to:
gather information of a file related to a plurality of importance parameters, wherein the plurality of importance parameters include at least two of: an author of the file, a number of users sharing the file, a relationship between the users, a uniqueness of the file, and a presence of particular keywords in the file, and wherein each of the plurality of importance parameters has a predetermined weighting,
determine a relative importance of the file which is stored on a non-transitory computer readable storage medium, based on the gathered information of the file related to the plurality of importance parameters and the predetermined weighting of each of the plurality of importance parameters, wherein an importance parameter of the plurality of importance parameters having a higher weighting than another of the plurality of importance parameters has more influence than the another importance parameter on the determination of the relative importance of the file, and
apply at least one of a first backup policy of a plurality of backup policies and a first security policy of a plurality of security policies to the file based on the determined relative importance of the file.

11. The apparatus of claim 10 wherein the processor is to apply both the first backup policy and the first security policy to the file.

* * * * *